United States Patent
Cheon

(10) Patent No.: US 11,256,780 B1
(45) Date of Patent: Feb. 22, 2022

(54) METHODS AND APPARATUS FOR FAST EIGENVALUE DECOMPOSITION OF HERMITIAN MATRICES

(71) Applicant: Marvell Asia Pte, Ltd., Singapore (SG)

(72) Inventor: Hyun Soo Cheon, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/326,142

(22) Filed: May 20, 2021

Related U.S. Application Data

(60) Provisional application No. 63/037,487, filed on Jun. 10, 2020, provisional application No. 63/027,912, filed on May 20, 2020.

(51) Int. Cl.
*H04B 7/08* (2006.01)
*G06F 17/16* (2006.01)
*H04B 7/0413* (2017.01)

(52) U.S. Cl.
CPC ........... *G06F 17/16* (2013.01); *H04B 7/0413* (2013.01); *H04B 7/08* (2013.01)

(58) Field of Classification Search
CPC . G06F 7/52; G06F 15/00; G06F 17/14; G06F 17/16; H04B 1/00; H04B 7/00; H04B 7/06; H04B 7/08; H04B 7/0413; H04B 7/0417; H04B 7/0456; H04B 7/0663; H04B 15/00; H04J 1/00; H04L 1/02; H04L 5/00; H04L 27/26; H01Q 3/00

USPC ................ 342/354, 373; 370/252, 329, 343; 375/219, 260, 267, 285, 295, 316, 343; 455/67, 69; 708/200, 400, 607

See application file for complete search history.

(56) References Cited

U.S. PATENT DOCUMENTS

| | | | |
|---|---|---|---|
| 2006/0155798 A1* | 7/2006 | Ketchum | G06F 17/16 708/607 |
| 2006/0245513 A1* | 11/2006 | Koo | H04L 25/0248 375/267 |

* cited by examiner

*Primary Examiner* — Shawkat M Ali
(74) *Attorney, Agent, or Firm* — JW Law Group; James M. Wu

(57) ABSTRACT

Methods and apparatus for fast Eigenvalue decomposition of Hermitian matrices are disclosed. In an exemplary embodiment, a method is provided for performing a decomposition iteration that includes identifying a largest off-diagonal term of a channel response matrix $\overline{X}$, generating a 2×2 Hermitian matrix $\overline{X}_2$ that includes the largest off-diagonal term, and generating a 2×2 Unitary matrix $\overline{U}_2$ from the 2×2 Hermitian matrix $\overline{X}_2$. The decomposition iteration also includes multiplying the 2×2 Unitary matrix $\overline{U}_2$ with the 2×2 Hermitian matrix $\overline{X}_2$ to generate an updated largest off-diagonal term and updating the channel response matrix $\overline{X}$ with the updated largest off-diagonal term. The method also includes performing one or more additional decomposition iterations until all off-diagonal terms of the channel response matrix $\overline{X}$ are less than a target value.

23 Claims, 4 Drawing Sheets

METHODS AND APPARATUS FOR FAST EIGENVALUE DECOMPOSITION OF HERMITIAN MATRICES

CROSS-REFERENCE TO RELATED APPLICATIONS

This application claims the benefit under 35 U.S.C. § 119 of U.S. Provisional Patent Application No. 63/027,912 filed on May 20, 2020 and entitled "METHOD AND APPARATUS FOR FAST EIGENVALUE DECOMPOSITION OF HERMITIAN MATRIX" and U.S. Provisional Patent Application No. 63/037,487 filed on Jun. 10, 2020 and entitled "INTEGER APPROXIMATION OF EIGEN VALUE DECOMPOSITION," both of which are incorporated by reference herein in their entireties.

FIELD

The exemplary embodiments of the present invention relate to telecommunications network. More specifically, the exemplary embodiments of the present invention relate to receiving and processing data streams via a wireless communication network.

BACKGROUND

High speed communication networks, such as multiple-input-multiple-output (MIMO) communication networks are becoming increasingly utilized to provide high speed data transmission between user equipment. For example, in a MIMO system a transmitter utilizes multiple transmit antennas and a receiver utilizes multiple receive antennas.

In a MIMO receiver, a channel response can be measured for each path from a transmit antenna to a receive antenna to form an M×N channel matrix. In this case, to find the best performing equalizer (spatial equalizer/beamformer), the second order statistics (covariance matrix) of the received signals are analyzed using Eigenvalue decomposition. Thus, fast Eigenvalue decomposition is needed for better receiver performance.

However, fast Eigenvalue decomposition is difficult to implement with reasonable complexity. For example, a conventional receiver utilizes high precision operations (e.g., floating point computations (add/multiplication/division) that requires large amounts of logic, board space, memory, and costs.

Therefore, it is desirable to have a system to perform Eigenvalue decomposition in a fast and efficient manner.

SUMMARY

In various exemplary embodiments, methods and apparatus are disclosed for implementing Eigenvalue decomposition to obtain the best receiver performance in a MIMO communication system. In an exemplary embodiment, a decomposition circuit is provided that operates to perform fast and efficient Eigenvalue decomposition in a receiver. In an embodiment, the decomposition circuit performs one or more iterations of a Jacobi rotation and utilizes table lookups to perform fast Eigenvalue decomposition with reduce logic, memory, space, and costs when compared to conventional systems.

In an exemplary embodiment, a method is provided for performing a decomposition iteration comprising operations of: identifying a largest off-diagonal term of a channel response matrix $\bar{X}$; generating a 2×2 Hermitian matrix $\bar{X}_2$ that includes the largest off-diagonal term; generating a 2×2 Unitary matrix $\bar{U}_2$ from the 2×2 Hermitian matrix $\bar{X}_2$; multiplying the 2×2 Unitary matrix $\bar{U}_2$ with the 2×2 Hermitian matrix $\bar{X}_2$ to generate an updated largest off-diagonal term; and updating the channel response matrix $\bar{X}$ with the updated largest off-diagonal term. The method also comprises performing one or more additional decomposition iterations until all off-diagonal terms of the channel response matrix $\bar{X}$ are less than a target value.

In an exemplary embodiment, apparatus is provided that comprises a processor and a memory configured to perform a decomposition iteration comprising operations of: identifying a largest off-diagonal term of a channel response matrix $\bar{X}$; generating a 2×2 Hermitian matrix $\bar{X}_2$ that includes the largest off-diagonal term; generating a 2×2 Unitary matrix $\bar{U}_2$ from the 2×2 Hermitian matrix $\bar{X}_2$; multiplying the 2×2 Unitary matrix $\bar{U}_2$ with the 2×2 Hermitian matrix $\bar{X}_2$ to generate an updated largest off-diagonal term; and updating the channel response matrix $\bar{X}$ with the updated largest off-diagonal term. The processor and the memory are configured to perform one or more additional decomposition iterations until all off-diagonal terms of the channel response matrix $\bar{X}$ are less than a target value.

Additional features and benefits of the exemplary embodiments of the present invention will become apparent from the detailed description, figures and claims set forth below.

BRIEF DESCRIPTION OF THE DRAWINGS

The exemplary aspect(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
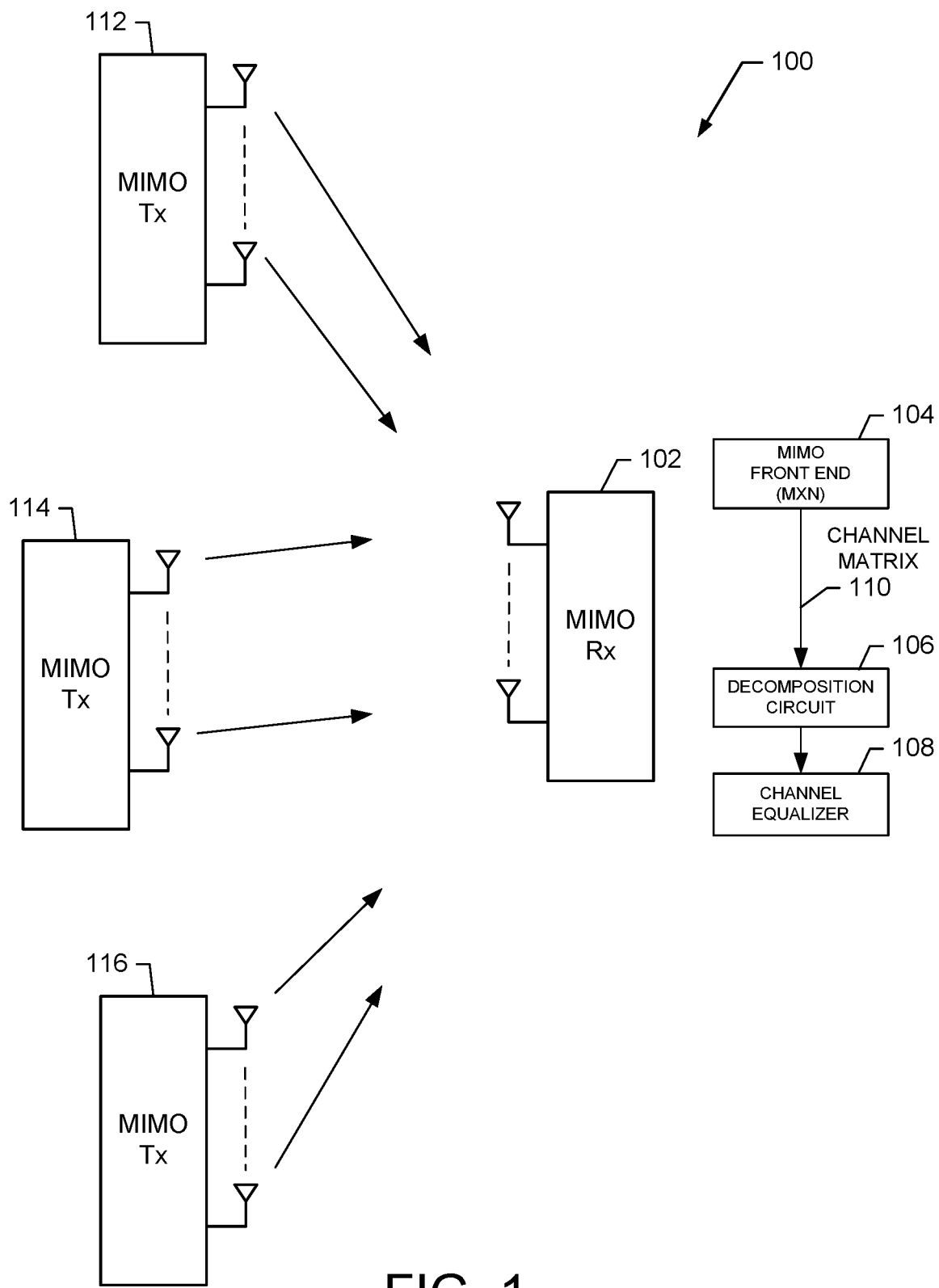
FIG. 1 shows a MIMO communication network comprising a MIMO receiver having an exemplary embodiment of a decomposition circuit configured for fast decomposition of Hermitian matrices.

In various exemplary embodiments, methods and apparatus for fast Eigenvalue decomposition in a communication network are disclosed.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It is understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of the embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows a MIMO communication network 100 comprising a MIMO receiver 102 having an exemplary embodiment of a decomposition circuit 106 configured for fast decomposition of Hermitian matrices. The receiver also includes a front end 104 and channel equalizer 108. During operation, MIMO transmitters 112, 114, and 116 transmit MIMO signals to the receiver 102. The front end 104 processes these received signals to generate a Hermitian channel matrix 110. For example, it will be assumed that the transmitter 112 includes M transmit antennas and the receiver 102 includes N receive antennas. In this case, a channel response can be measured for each path (from transmit antenna Mx to receive antenna Ny), to form an M×N channel matrix 110. In this case, to find the best performing equalizer (spatial equalizer/beamformer), the second order statistics (covariance matrix) of the received signal are analyzed. To do this, Eigenvalue decomposition can be utilized. The decomposition circuit 106 performs a fast and efficient decomposition of the channel matrix 110 to generate a decomposed matrix that is input to the channel equalizer 108. Channel equalization is then performed by the channel equalizer 108 to obtain the best receiver performance.

In various embodiments, the MIMO communication network 100 comprises a fourth generation (4G) long term evolution (LTE) or fifth generation (5G) new radio (NR) communication network. Aspects of the invention are also suitable for use with other types of communication networks. A more detailed description of the implementation and operation of the decomposition circuit 106 are provided below.

Figure 2:
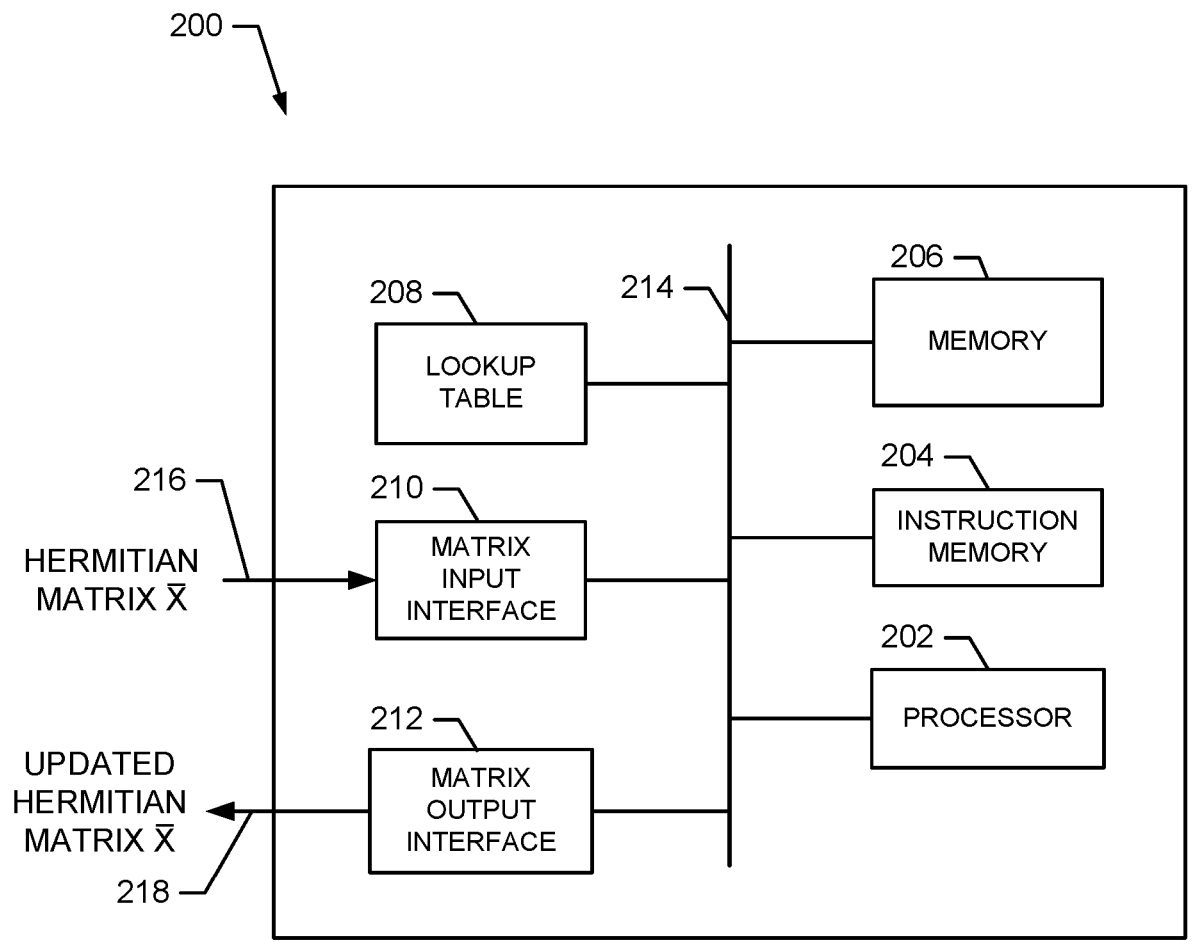
FIG. 2 shows an exemplary embodiment of a decomposition circuit.

FIG. 2 shows an exemplary embodiment of a decomposition circuit 200. The decomposition circuit 200 is suitable for use as the decomposition circuit 118 shown in FIG. 1. In an embodiment, the decomposition circuit 200 comprises processor 202, instruction memory 204, memory 206, lookup table 208, matrix input interface 210, and matrix output interface 212, all coupled to communicate over bus 214.

Various exemplary embodiments of the decomposition circuit 200 operate to compute Eigenvalues and Eigenvectors for a Hermitian matrix. In MIMO systems, all received signals are observed and/or formulated with matrix equations. The ($2^{nd}$ order) statistics of these signals appears as a "Hermitian" symmetric matrix. For example, a covariance matrix of the received signals has "Hermitian symmetric" properties. Generally, if a complex numbered matrix is equal to its Hermitian transpose (transpose+conjugate), (e.g., $A=A^H$ where H: Hermitian transpose) the matrix is referred to as a "Hermitian" matrix or "Hermitian symmetric matrix"
Eigenvalue Decomposition To analyze a multi-dimension signal matrix, it can be decomposes as follows. Assume that $(A=V E V^H)$, where V is a Unitary matrix/Eigen matrix and E is a diagonal matrix. In most cases, each column of the Eigen matrix V indicates direction of each subspace. Also, diagonal elements of the diagonal matrix E indicate magnitude of the subspace. For example, a 3×3 matrix A could have 3 subspaces (3D space). Each column of Eigen matrix V indicates the direction of 3D space, and each diagonal element of E shows the length of that direction vector.

During operation, the decomposition circuit 200 processes the Hermitian matrix $\overline{X}$ 216 received by the interface 210 to generate an updated (decomposed) Hermitian matrix $\overline{X}$ 218 that is output form the output interface 212. In an embodiment, the input interface 216 stores the received Hermitian matrix $\overline{X}$ 216 in the memory 206. During operation, the processor 202 executes instructions in the instruction memory 204 to perform the operations described herein.

The processor 202 operates to determine whether a largest off-diagonal term of the matrix $\overline{X}$ is less than a threshold value. The threshold value can be any desired value. If the largest off-diagonal term of the matrix $\overline{X}$ is less than the threshold value, then the matrix $\overline{X}$ stored in the memory 206 is output from the output interface 212 as Hermitian matrix $\overline{X}$ 218. If the largest off-diagonal term of the matrix $\overline{X}$ is not less than the threshold value, then the processor operates to perform a Jacobi rotation to reduce the size of the off-diagonal term. Once the size off-diagonal term is reduced, the adjusted matrix elements are stored back to the matrix $\overline{X}$. The processor 202 then determines the size of the next largest off-diagonal term, and if that term is greater than the threshold value, the processor 202 performs the Jacobi rotation again to reduce that term.

In an embodiment, the processor 202 repeats one or more iterations of the Jacobi rotation process until the largest off-diagonal term of the matrix $\overline{X}$ is less than the threshold value or until a selected number of iterations have been performed. The resulting updated matrix $\overline{X}$ 218 is then passed from the memory 206 and output by the output interface 212.

Accordingly, the decomposition circuit 200 operates to provide an efficient way to reduce the large off-diagonal terms of the received Hermitian matrix. For example, all the off-diagonal terms are Hermitian symmetric, so that an off-diagonal term $x_{i,j}=x_{j,i}*$, where * notes "complex conjugate". That means that eliminating (or making it smaller or closer to a value near 0) one off-diagonal term $x_{i,j}$ by Jacobian rotation (multiplying a rotation matrix) eliminates its opposite off-diagonal term, and results in bigger diagonal terms $x_{i,i}$ and $x_{j,j}$. In an embodiment, the decomposition circuit 200 performs one or more of the following operations to provide fast matrix decomposition.

A. Measuring the norm of upper or low diagonal elements of a received matrix and picking up the largest element that exceeds a threshold value.

B. Forming a 2×2 Hermitian matrix that includes the largest element.

C. Forming a 2×2 unitary matrix.

D. Multiplying the 2×2 Hermitian matrix and 2×2 unitary matrices together to generate updated elements of the received matrix.

E. Storing the updated elements in the received matrix.

F. Repeating one or more iterations of the above operations until all off-diagonal terms are less than the threshold or until a selected number of iterations are performed.

In various exemplary embodiments, the decomposition circuit 200 performs Eigenvalue decomposition while providing at least the following advantages.

A. Utilizing a small number of logic gates to provide low complexity/smaller die size.

B. Fast computation so that less clock cycles are needed to obtain the result.

C. Minimizes size of memory to result in small die size and less cost.

D. Accepts flexible input matrix sizes, which determine the total clock cycles to acquire the result.

E. The target accuracy is user-controllable as well as the total number of clock cycles needed to obtain the result.

Accordingly, the various embodiments of the decomposition circuit 200 operate to perform one or more iterations of a Jacobi rotation to reduce off-diagonal elements of a Hermitian matrix. A detailed description of the operation of the decomposition circuit 200 is provided with reference to FIG. 3. Thus, embodiments of the decomposition circuit provide a fast, small memory, and low power circuit that performs decomposition of Hermitian matrices. In contrast, conventional systems use high precision floating point computations that require extensive logic, large memories, large size, large costs, and fixed processing times.

Figure 3:
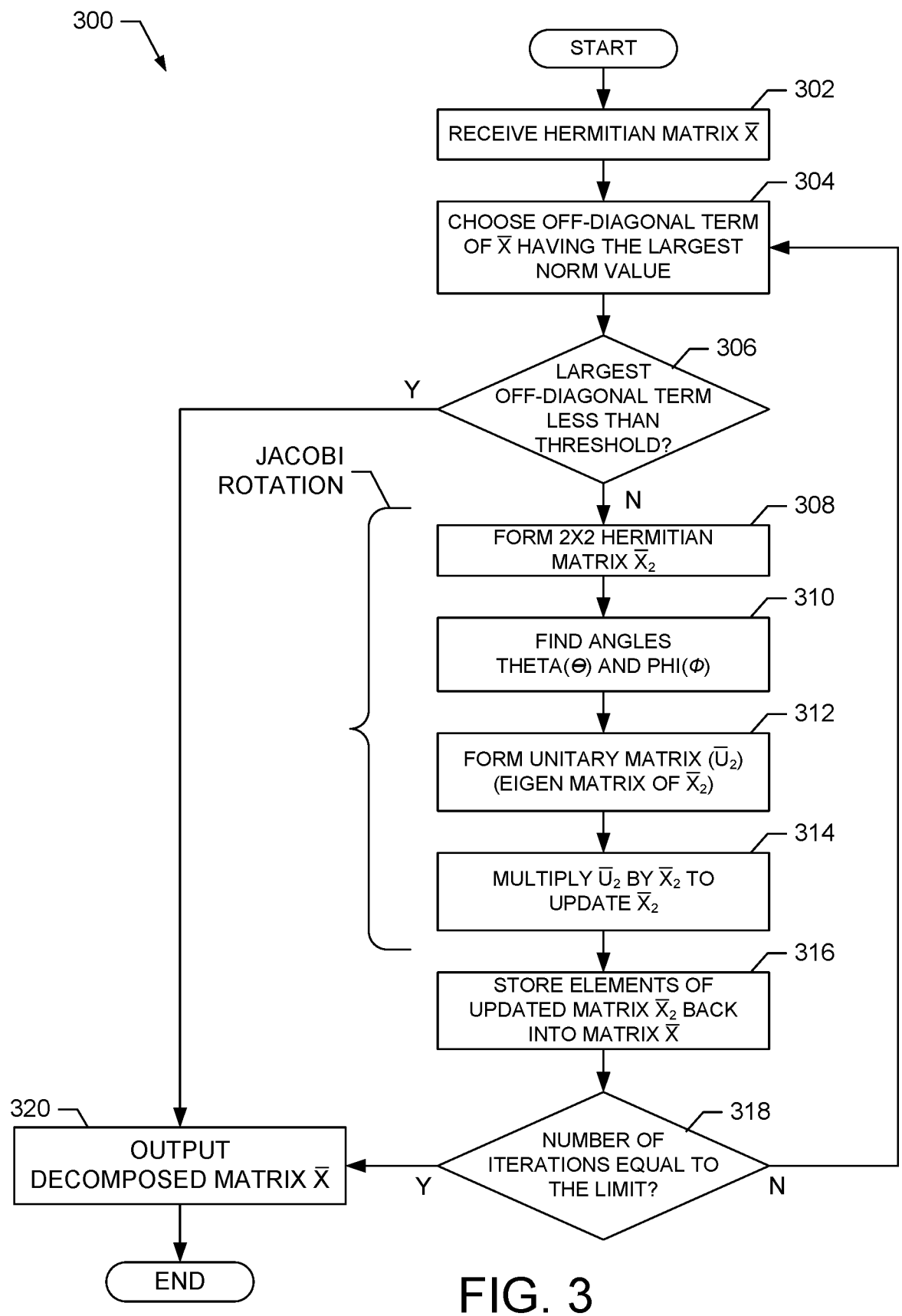
FIG. 3 shows a method for Eigenvalue decomposition in accordance with embodiments of the present invention.

FIG. 3 shows a method 300 for Eigenvalue decomposition in accordance with embodiments of the present invention. For example, the method 300 is performed by the decomposition circuit 200 shown in FIG. 2 or the apparatus 400 shown in FIG. 4.

At block 302, a Hermitian matrix $\overline{X}$ is received. For example, the Hermitian matrix $\overline{X}$ represents received transmissions in a MIMO communication system and is received by the matrix input interface 210. The received matrix $\overline{X}$ is stored in the memory 206.

At block 306, an off-diagonal element (or term) $(x_{p,q})$ of the matrix $\overline{X}$ having the largest norm value is determined. For example, the processor 202 determines the off-diagonal term $(x_{p,q})$ having the largest norm value in the received matrix $\overline{X}$ according to the following.

Norm value=$|x_{p,q}|^2$

At block 306, a determination is made as to whether the norm value of the largest off-diagonal term $(x_{p,q})$ is less than a threshold. For example, the processor 202 makes this determination. If the norm value of the largest off-diagonal term is less than a threshold, the method proceeds to block 320. If the norm value of the largest off-diagonal term is not less than a threshold, the method proceeds to block 308.

At block 308, a Jacobi rotation begins by forming a 2×2 Hermitian matrix $\overline{X}_2$ from matrix $\overline{X}$ based on the largest off-diagonal term. For example, the processor 202 forms the 2×2 $\overline{X}_2$ matrix as follows, where $(x^*_{p,q})$ is the conjugate of $(x_{p,q})$.

$$X_2 = \begin{bmatrix} x_{p,p} & x_{p,q} \\ x^*_{p,q} & x_{q,q} \end{bmatrix}$$

At block 310, angles theta ($\theta$) and phi ($\phi$) are determined from the 2×2 $\overline{X}_2$ matrix. For example, these values are used to form a 2×2 Unitary matrix $\overline{U}_2$, which is equivalent to an Eigen matrix of $\overline{X}_2$. In doing this, it is possible to save clock cycle counts and logic by using the look-up table 208 and ARCTAN approximations. The resulting matrix is an approximated "Jacobi rotation matrix." The processor 202 determines the angles theta and phi from the following expressions. In an embodiment, the processor 202 accesses the lookup table 208 to obtain ARCTAN approximations.

$\theta = \angle x_{p,q}$ (or arg $x_{p,q}$), where $[e^{j\theta}=x_{p,q}/|x_{p,q}|]$ $$\phi = \frac{1}{2}\text{Tan}^{-1}\left(\frac{2|x_{p,q}|}{x_{q,q} - x_{p,p}}\right)$$

At block 312, a Unitary matrix $\overline{U}_2$ is formed from the determined angles theta and phi. For example, the processor 202 forms the Unitary matrix $\overline{U}_2$ from the following expression.

$$U_2 = \begin{bmatrix} \cos\phi & -\sin\phi e^{j\theta} \\ \sin\phi & \cos\phi e^{j\theta} \end{bmatrix}$$

At block 314, the Unitary matrix $\overline{U}_2$ is multiplied by the matrix $\overline{X}_2$ to generate updated elements for the matrix $\overline{X}_2$. In an embodiment, the multiplication expression $[\hat{U}_2 \hat{X}_2 \hat{U}_2^H]$ is performed to generate updated elements $(x_{p,q})$, $(x_{p,p})$, $(x_{q,q})$, and $(x_{q,p})$. These updated elements result in a reduction of the largest off-diagonal term. For example, the processor 202 performs this multiplication.

At block 316, the updated elements are stored in the matrix $\overline{X}$ that is stored in the memory. For example, the processor 202 stores the updated elements in the matrix $\overline{X}$ that is stored in the memory 206.

At block 318, a determination is made as to whether a selected number of iterations of the Jacobi rotation (e.g., blocks 308-314) have been performed. For example, the processor 202 makes this determination. If a selected number of iterations of the Jacobi rotation have been performed, the method proceeds to block 320. If a selected number of iterations of the Jacobi rotation have not been performed, the method proceeds to block 304.

At block 320, the matrix $\overline{X}$ that is stored in the memory is output. For example, the processor 202 retrieves the matrix $\overline{X}$ that is stored in the memory 206 and outputs this matrix using the matrix output interface 212.

Thus, the method 300 operates to perform decomposition of a received signal matrix in a MIMO system. It should be noted that the method 300 is exemplary and that the operations may be rearranged, added to, deleted, combined, or otherwise modified within the scope of the embodiments.

Figure 4:
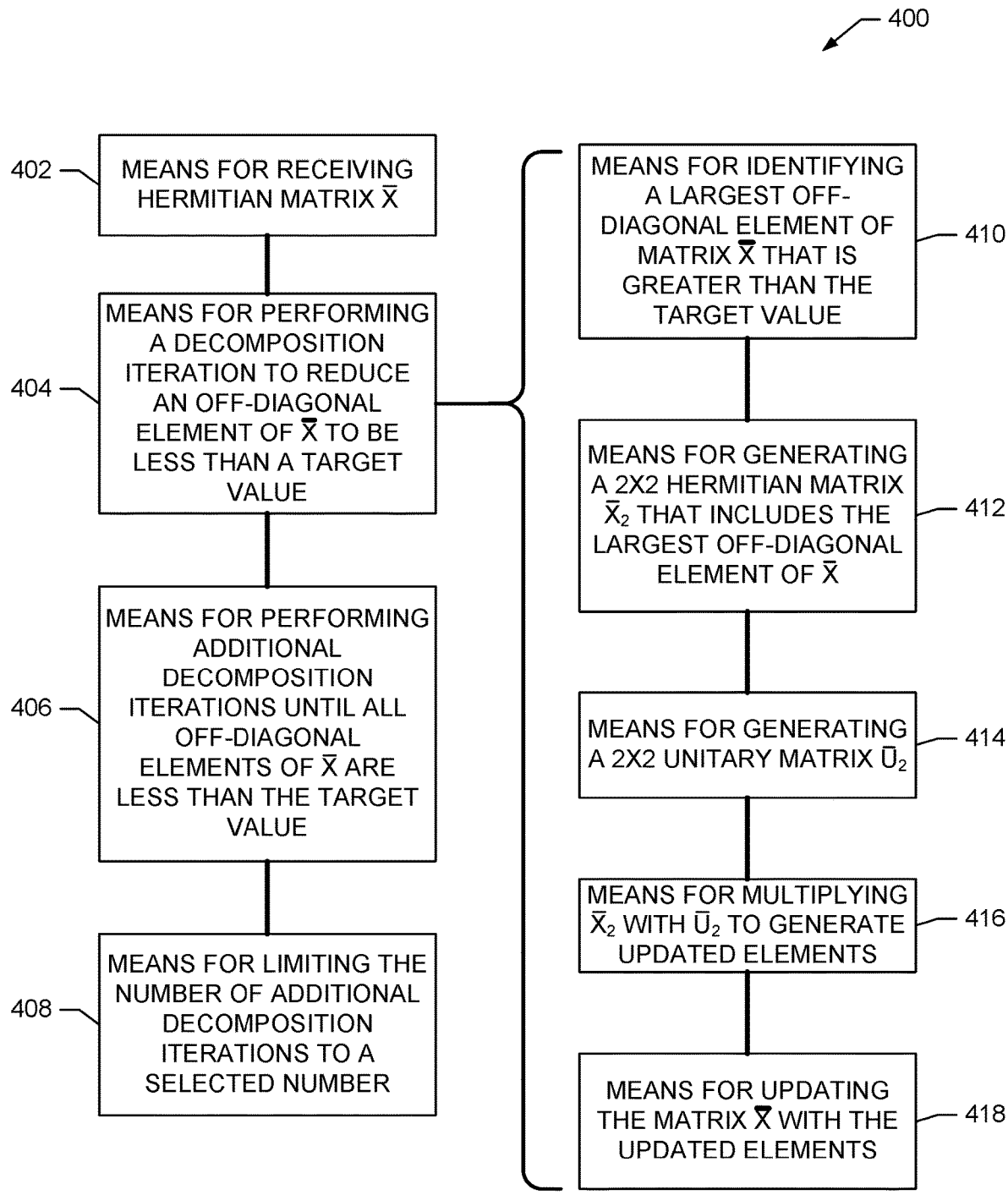
FIG. 4 shows an exemplary embodiment of a decomposition apparatus.

FIG. 4 shows an exemplary embodiment of a decomposition apparatus 400. The decomposition apparatus 400 is suitable for use as the decomposition circuit 118 shown in FIG. 1. In an embodiment, the decomposition apparatus 400 comprises means 402 for receiving a Hermitian matrix $\overline{X}$, which in an embodiment comprises matrix input interface 210. The decomposition apparatus 400 also comprises means 404 for performing a decomposition iteration to reduce an off-diagonal element of the matrix $\overline{X}$ to be less than a target value, which in an embodiment comprises the apparatus 200 in which the processor 202 executes the instructions 204 and utilizes the memory 206 and lookup table 208 to perform this function. The decomposition apparatus 400 also comprises means 406 for performing additional decomposition iterations until all off-diagonal elements of $\overline{X}$ are less than the target value, which in an embodiment comprises the operation of the processor 202. The decomposition apparatus 400 also comprises means 408 for limiting the number of additional decomposition iterations to a selected number, which in an embodiment comprises the operation of the processor 202.

In an embodiment, the means 404 for performing the decomposition iteration comprises means 410 for identifying a largest off-diagonal term of a channel response matrix X, which in an embodiment comprises the operation of the processor 202 executing the instructions 204 and utilizes the memory 206 and lookup table 208 to perform this function as described herein.

The means 404 for performing the decomposition iteration also comprises means 412 for generating a 2×2 Hermitian matrix $\overline{X}_2$ that includes the largest off-diagonal term, which in an embodiment comprises which in an embodiment comprises the operation of the processor 202 executing the instructions 204 and utilizes the memory 206 and lookup table 208 to perform this function as described herein.

The means 404 for performing the decomposition iteration also comprises means 414 for generating a 2×2 unitary matrix $\overline{U}_2$ from the 2×2 Hermitian matrix, which in an embodiment comprises which in an embodiment comprises the operation of the processor 202 executing the instructions 204 and utilizes the memory 206 and lookup table 208 to perform this function as described herein.

The means 404 for performing the decomposition iteration also comprises means 416 for multiplying the 2×2 unitary matrix $\overline{U}_2$ with the 2×2 Hermitian matrix $\overline{X}_2$ to generate updated elements, which in an embodiment comprises the operation of the processor 202 executing the instructions 204 and utilizes the memory 206 and lookup table 208 to perform this function as described herein as described herein.

The means 404 for performing the decomposition iteration also comprises means 418 for updating the channel response matrix $\overline{X}$ with the updated elements, which in an embodiment comprises the operation of the processor 202 executing the instructions 204 and utilizes the memory 206 and lookup table 208 to perform this function as described herein.

Implementing Basic Algorithms

In various embodiments, the processor 202 executes the instructions 204 and utilizes the lookup table 208 to implement one more of the following basic algorithms to perform the operations described herein.

A. Avoiding Integer Division and Square Root

In an embodiment, the processor 202 substitutes division with multiplication and uses the lookup table 208 in order to get more precision. For example, to divide a with b, the processor 202 performs the following operations.

1. Using b, find a proper weight (a) to make b a power of $2^n$ from the lookup table 208;
2. Multiply the weight a with a; and
3. Perform an n-bit right shift on the result of the multiplication in (2).

B. Handling Complex Numbers with Sin and Cos Functions

When handling complex numbers, trigonometric functions, and converting an ordinary complex number into its magnitude and phase, unwanted division and square root operations may need to be performed. Using the above operations it is possible to minimize division and square root operations when handling complex-integer numbers, and thereby reduce complexity.

B1. Calculating $$\frac{x_r + jx_i}{|x|} = \cos\theta + j\sin\theta$$

Consider an example to convert a complex number $x = x_r + jx_i$ to $re^{j\theta}$.

1. Find $|r|^2 = x_r^2 + x_i^2$ and using it, find a weight a to make it power of two ($2^{2n}$). Now $|r|$ is scaled to $2^n$.
2. Multiply a to both $x_r$ and $x_i$.
3. Perform n-bit right shift to both $x_r$ and $x_i$.
4. Now $\cos\theta$ and $\sin\theta$ are determined from bit shifted $x_r$ and $x_i$.

B2 Calculating $\theta$

1. Find $$\tan\theta = \frac{x_i}{x_r} = \frac{\sin\theta}{\cos\theta}$$

(a) Find a weight to make $x_r$ power of $2^n$ and multiply it to $x_i$.
(b) Perform an n-bit right shift to $x_i$.
(c) Arrive at $\tan\theta$ as a result.

2. Applying the result to an ARCTAN function lookup table or approximated ARCTAN function.
3. Arrive at $\theta$ as a result.

Eigenvalue Decomposition

Eigenvalue decomposition begins with calculating a Jacobian rotation matrix as an Eigen matrix for a 2×2 Hermitian matrix as follows.

Start with a Hermitian matrix $$X = \begin{bmatrix} x_0 & x_1^* \\ x_1 & x_3 \end{bmatrix},$$

where $x_0$ and $x_3$ are real numbers, and $x_1$ is a complex number. The matrix X can be decomposed as:

$$X = \begin{bmatrix} x_0 & x_1^* \\ x_1 & x_3 \end{bmatrix} = \begin{bmatrix} 1 & 0 \\ 0 & e^{j\theta} \end{bmatrix}\begin{bmatrix} x_0 & x_2 \\ x_2 & x_3 \end{bmatrix}\begin{bmatrix} 1 & 0 \\ 0 & e^{-j\theta} \end{bmatrix} = \begin{bmatrix} x_0 & x_2 e^{-j\theta} \\ x_2 e^{j\theta} & x_3 \end{bmatrix}, \quad (1)$$

where $x_2$ is a real number, and $x_1 = x_2 e^{j\theta}$, and $\theta = \angle x_1$.
If a Jacobian rotation matrix $$R = \begin{bmatrix} \cos\phi & -\sin\phi \\ \sin\phi & \cos\phi \end{bmatrix}$$

diagonalizes a real-numbered symmetric matrix $$\overline{X} = \begin{bmatrix} x_0 & x_2 \\ x_2 & x_3 \end{bmatrix},$$

it has the following properties.

$$D = \begin{bmatrix} \lambda_1 & 0 \\ 0 & \lambda_2 \end{bmatrix} = R\overline{X}R^H, \quad (2)$$

and $$\tan 2\phi = \frac{2x_2}{x_3 - x_0}, \phi = \frac{1}{2}\arctan\left(\frac{2x_2}{x_3 - x_0}\right) \quad (3)$$

Therefore, a complex rotation matrix which diagonalizes X can be written as:

$$R = R \begin{bmatrix} 1 & 0 \\ 0 & e^{j\theta} \end{bmatrix} = \begin{bmatrix} \cos\phi & -\sin\phi e^{j\theta} \\ \sin\phi & \cos\phi e^{j0} \end{bmatrix} \quad (4)$$

so that;

$$\overline{R}X\overline{R}^H = RXR^H \quad (5)$$

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of these exemplary embodiments.

What is claimed is:

1. A method, comprising:
performing, by a receiver, an iteration comprising operations of:
identifying a largest off-diagonal term of a channel response matrix $\overline{X}$;
generating a 2×2 Hermitian matrix $\overline{X}_2$ that includes the largest off-diagonal term;
generating a 2×2 Unitary matrix $\overline{U}_2$ from the 2×2 Hermitian matrix $\overline{X}_2$;
multiplying the 2×2 Unitary matrix $\overline{U}_2$ with the 2×2 Hermitian matrix $\overline{X}_2$ to generate an updated largest off-diagonal term; and
updating the channel response matrix $\overline{X}$ with the updated largest off-diagonal term; and
performing one or more additional iterations until all off-diagonal terms of the channel response matrix $\overline{X}$ are less than a target value.

2. The method of claim 1, further comprising performing the one or more additional iterations until a selected number of iterations are performed.

3. The method of claim 1, further comprising receiving the channel response matrix $\overline{X}$, wherein the channel response matrix $\overline{X}$ comprises M columns and N rows.

4. The method of claim 1, wherein the operation of identifying comprises identifying the largest off-diagonal term to be an element $(x_{p,q})$ of the channel response matrix $\overline{X}$ having a largest norm value determined from $|x_{p,q}|^2$.

5. The method of claim 4, wherein the operation of generating the 2×2 Hermitian matrix comprises forming the 2×2 Hermitian matrix $\overline{X}_2$ from the element $(x_{p,q})$ of the channel response matrix $\overline{X}$ as:

$$\overline{X}_2 = \begin{bmatrix} x_{p,p} & x_{p,q} \\ x^*_{p,q} & x_{q,q} \end{bmatrix}$$

where $x^*_{p,q}$ is a conjugate of $x_{p,q}$.

6. The method of claim 5, wherein the operation of generating the 2×2 Unitary matrix $\overline{U}_2$ comprises determining angles theta ($\theta$) and phi ($\phi$) from the expressions:

$$\theta = \angle x_{p,q} \text{ (or arg } x_{p,q})$$

where $[e^{j\theta} = x_{p,q}/|x_{p,q}|]$ $$\phi = \frac{1}{2}\text{Tan}^{-1}\left(\frac{2|x_{p,q}|}{x_{q,q} - x_{p,p}}\right).$$

7. The method of claim 6, wherein the operation of generating the 2×2 Unitary matrix $\overline{U}_2$ comprises determining ARCTAN values from a lookup table.

8. The method of claim 6, wherein the operation of generating the 2×2 Unitary matrix $\overline{U}_2$ comprises forming the 2×2 Unitary matrix $\overline{U}_2$ as:

$$\overline{U}_2 = \begin{bmatrix} \cos\phi & -\sin\phi e^{j\theta} \\ \sin\phi & \cos\phi e^{j\theta} \end{bmatrix}.$$

9. The method of claim 8, wherein the operation of multiplying compromises multiplying an expression $[\overline{U}_2 \overline{X}_2 \overline{U}_2^H]$ to generate updated elements $(x_{p,q})$, $(x_{p,p})$, $(x_{q,q})$, and $(x_{q,p})$.

10. The method of claim 9, wherein the operation of updating the channel response matrix $\overline{X}$ comprises updating the channel response matrix $\overline{X}$ with the updated elements $(x_{p,q})$, $(x_{p,p})$, $(x_{q,q})$, and $(x_{q,p})$.

11. An apparatus comprising:
a processor and a memory coupled to the processor, the processor configured to perform a decomposition iteration comprising operations of:
identifying a largest off-diagonal term of a channel response matrix $\overline{X}$;
generating a 2×2 Hermitian matrix $\overline{X}_2$ that includes the largest off-diagonal term;
generating a 2×2 Unitary matrix $\overline{U}_2$ from the 2×2 Hermitian matrix $\hat{X}_2$;
multiplying the 2×2 Unitary matrix $\overline{U}_2$ with the 2×2 Hermitian matrix $\overline{X}_2$ to generate an updated largest off-diagonal term; and
updating the channel response matrix $\overline{X}$ with the updated largest off-diagonal term; and
the processor further configured to perform one or more additional decomposition iterations until all off-diagonal terms of the channel response matrix $\overline{X}$ are less than a target value.

12. The apparatus of claim 11, wherein the processor is configured to perform the one or more additional decomposition iterations until a selected number of iterations are performed.

13. The apparatus of claim 11, wherein the operation of identifying comprises identifying the largest off-diagonal term to be an element $(x_{p,q})$ of the channel response matrix $\overline{X}$ having a largest norm value determined from $|x_{p,q}|^2$.

14. The apparatus of claim 13, wherein the operation of generating the 2×2 Hermitian matrix comprises forming the 2×2 Hermitian matrix $\overline{X}_2$ from the channel response matrix $\overline{X}$ as:

$$\overline{X}_2 = \begin{bmatrix} x_{p,p} & x_{p,q} \\ x^*_{p,q} & x_{q,q} \end{bmatrix}$$

where $x^*_{p,q}$ is a conjugate of $x_{p,q}$.

15. The apparatus of claim 14, wherein the operation of generating the 2×2 Unitary matrix $\overline{U}_2$ comprises determining angles theta ($\theta$) and phi ($\phi$) from the expressions:

$$\theta = \angle x_{p,q} \text{ (or arg } x_{p,q})$$

where $[e^{j\Theta} = x_{p,q}/|x_{p,q}|]$ $$\phi = \frac{1}{2}\text{Tan}^{-1}\left(\frac{z|x_{p,q}|}{x_{q,q} - x_{p,p}}\right).$$

16. The apparatus of claim 15, wherein the operation of generating the 2×2 Unitary matrix $\overline{U}_2$ comprises determining ARCTAN values from a lookup table.

17. The apparatus of claim 15, wherein the operation of generating the 2×2 Unitary matrix $\overline{U}_2$ comprises forming the 2×2 Unitary matrix $\overline{U}_2$ as:

$$U_2 = \begin{bmatrix} \cos\phi & -\sin\phi e^{j\theta} \\ \sin\phi & \cos\phi e^{j\theta} \end{bmatrix}.$$

18. The apparatus of claim 17, wherein the operation of multiplying compromises multiplying an expression $[\overline{U}_2 \overline{X}_2 \overline{U}_2^H]$ to generate updated elements $(x_{p,q})$, $(x_{p,p})$, $(x_{q,q})$, and $(x_{q,p})$.

19. The apparatus of claim 18, wherein the operation of updating the channel response matrix $\overline{X}$ comprises updating the channel response matrix $\overline{X}$ with the updated elements $(x_{p,q})$, $(x_{p,p})$, $(x_{q,q})$, and $(x_{q,p})$.

20. Apparatus for matrix decomposition in a communication network, the apparatus comprising:
  means for performing an iteration of:
    identifying a largest off-diagonal term of a channel response matrix $\overline{X}$;
    generating a 2×2 Hermitian matrix $\overline{X}_2$ that includes the largest off-diagonal term;
    generating a 2×2 Unitary matrix $\overline{U}_2$ from the 2×2 Hermitian matrix $\overline{X}_2$;
    multiplying the 2×2 Unitary matrix $\overline{U}_2$ with the 2×2 Hermitian matrix $\overline{X}_2$ to generate an updated largest off-diagonal term; and
    updating the channel response matrix $\overline{X}$ with the updated largest off-diagonal term; and
  means for performing one or more additional iterations until all off-diagonal terms of the channel response matrix $\overline{X}$ are less than a target value.

21. The apparatus of claim 20, further comprising means for performing the one or more additional iterations until a selected number of iterations are performed.

22. A receiver configured to communicate over a wireless network, the receiver comprising:
  a processor and a memory coupled to the processor, the processor configured to perform a decomposition iteration comprising operations of:
    identifying a largest off-diagonal term of a channel response matrix $\overline{X}$;
    generating a 2×2 Hermitian matrix $\overline{X}_2$ that includes the largest off-diagonal term;
    generating a 2×2 Unitary matrix $\overline{U}_2$ from the 2×2 Hermitian matrix $\overline{X}_2$;
    multiplying the 2×2 Unitary matrix $\overline{U}_2$ with the 2×2 Hermitian matrix $\overline{X}_2$ to generate an updated largest off-diagonal term; and
    updating the channel response matrix $\overline{X}$ with the updated largest off-diagonal term; and
  the processor further configured to perform one or more additional decomposition iterations until all off-diagonal terms of the channel response matrix $\overline{X}$ are less than a target value.

23. The receiver of claim 22, wherein the processor is configured to perform the one or more additional decomposition iterations until a selected number of iterations are performed.

* * * * *